Nov. 2, 1965 L. NEUMANN 3,215,860

CLOCK PULSE CONTROLLED SINE WAVE SYNTHESIZER

Filed Nov. 23, 1962 3 Sheets-Sheet 1

INVENTOR.
LEOPOLD NEUMANN
BY Weingarten, Orenbuch, & Pandiscio
ATTORNEYS

Nov. 2, 1965 L. NEUMANN 3,215,860

CLOCK PULSE CONTROLLED SINE WAVE SYNTHESIZER

Filed Nov. 23, 1962 3 Sheets-Sheet 2

INVENTOR.
LEOPOLD NEUMANN
BY Weingarten, Orenbuch, & Pandiscio
ATTORNEYS

Nov. 2, 1965 L. NEUMANN 3,215,860

CLOCK PULSE CONTROLLED SINE WAVE SYNTHESIZER

Filed Nov. 23, 1962 3 Sheets-Sheet 3

| INCREMENTS | TERMINAL | | | | |
|---|---|---|---|---|---|
| | 16a | 16b | 16c | 16d | 16e |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 1 | 1 | 1 | 1 | 1 |
| 7 | 1 | 1 | 1 | 1 | 0 |
| 8 | 1 | 1 | 1 | 0 | 0 |
| 9 | 1 | 1 | 0 | 0 | 0 |
| 10 | 1 | 0 | 0 | 0 | 0 |
| 11 | 0 | 1 | 1 | 1 | 1 |
| 12 | 0 | 0 | 1 | 1 | 1 |
| 13 | 0 | 0 | 0 | 1 | 1 |
| 14 | 0 | 0 | 0 | 0 | 1 |
| 15 | 0 | 0 | 0 | 0 | 0 |
| 16 | 0 | 0 | 0 | 0 | 0 |
| 17 | 0 | 0 | 0 | 0 | 1 |
| 18 | 0 | 0 | 0 | 1 | 1 |
| 19 | 0 | 0 | 1 | 1 | 1 |
| 20 | 0 | 1 | 1 | 1 | 1 |

FIG. 5

INVENTOR.

LEOPOLD NEUMANN

BY Weingarten, Orenbuch, & Pandiscio

ATTORNEYS 3,215,860

CLOCK PULSE CONTROLLED SINE WAVE SYNTHESIZER

Leopold Neumann, Boston, Mass., assignor to Epsco, Incorporated, Cambridge, Mass., a corporation of Massachusetts Filed Nov. 23, 1962, Ser. No. 239,569
2 Claims. (Cl. 307—88.5)

This invention relates in general to devices for generating sinusoidally varying electrical signals and more particularly pertains to apparatus for generating an electrical signal whose periodic variations adhere precisely to the functions of a sine wave and in which the amplitude of the periodic variations is determined by a reference D.C. voltage.

It is known that sine waves of electrical energy can be created from a plurality of pulses whose envelope approximates a sine wave. In employing the known method of pulse addition, harmonic signals are usually found to occur at every odd multiple of the fundamental. To obtain a precise sine wave by the known technique, many pulses must be used to keep down the harmonic content and the harmonic signals must be removed from the fundamental by filtering out the unwanted signals. Where the amplitude of the sine wave is to be employed as a reference, the filter must be such that it changes the fundamental amplitude a precisely known amount. Where the sine wave to be generated is always of the same fundamental frequency, the known method of pulse addition offers a practicable technique because sharp filters are available which can readily remove the undesired harmonics. Such filters can be tuned to have the desired amplitude characteristics at the operating frequency. Where, however, the fundamental frequency of the sine wave may be selected from a large range of frequencies, the known method of pulse addition would require a sharp filter which can be tuned over the frequency range involved or would require a large number of sharp filters, each filter being used over a small part of the range. In the case where a number of filters are employed, the number of such filters is related to the width of the frequency range to be covered and the cost of the apparatus tends to be inordinate. In the case where a tunable filter is employed, the filter will have to be an elaborate device to be usable over a large frequency since the filter must both attenuate undesired harmonics and precisely preserve the amplitude of the fundamental. Additional complexity, moreover, results from the requirement that the filter must track the tunable sine wave signal generator.

The primary object of the invention is to provide apparatus for generating precise electrical sine waves whose fundamental frequency can be selected over a broad frequency range and in which harmonics generated with the fundamental are removed by one of a small number of filters which need not be tunable. Where the selection of the fundamental is to be restricted to a frequency range of about an octave, filtering can be accomplished by a single filter.

The invention resides, essentially, in generating a waveform from a plurality of consecutive pulses which form a wave containing a fundamental sine wave and only very high order harmonics. By choosing predetermined values for the width and amplitude of each pulse, lower order harmonics such as the 3rd, 5th, 7th, 9th, etc. are avoided in the wave. The wave is fed into a filter which attenuates the harmonics and, therefore, only the fundamental emerges from the filter. Because only very high order harmonics are present in the wave, the filter is constructed to suppress to the desired degree all frequencies above a chosen frequency within the useful range of the filter. The chosen frequency is enough above the highest fundamental to be emitted by the signal generating apparatus so that all fundamental frequencies pass through the filter without material attenuation.

The invention, both as to its construction and mode of operation, can be better understood from a perusal of the following exposition when considered together with the accompanying drawings in which:

FIG. 5 is a truth table pertaining to the operation of the current switch set.

Fourier analysis is a mathematical method of resolving arbitrary signals into sinusoidal components. Where the signal to be resolved is periodically repetitive, sine waves are obtained whose frequencies are integral multiples (i.e. harmonics) of the repetition frequency. The resolution then results in a series of mathematical terms known as a Fourier series.

Figures 1, 2:
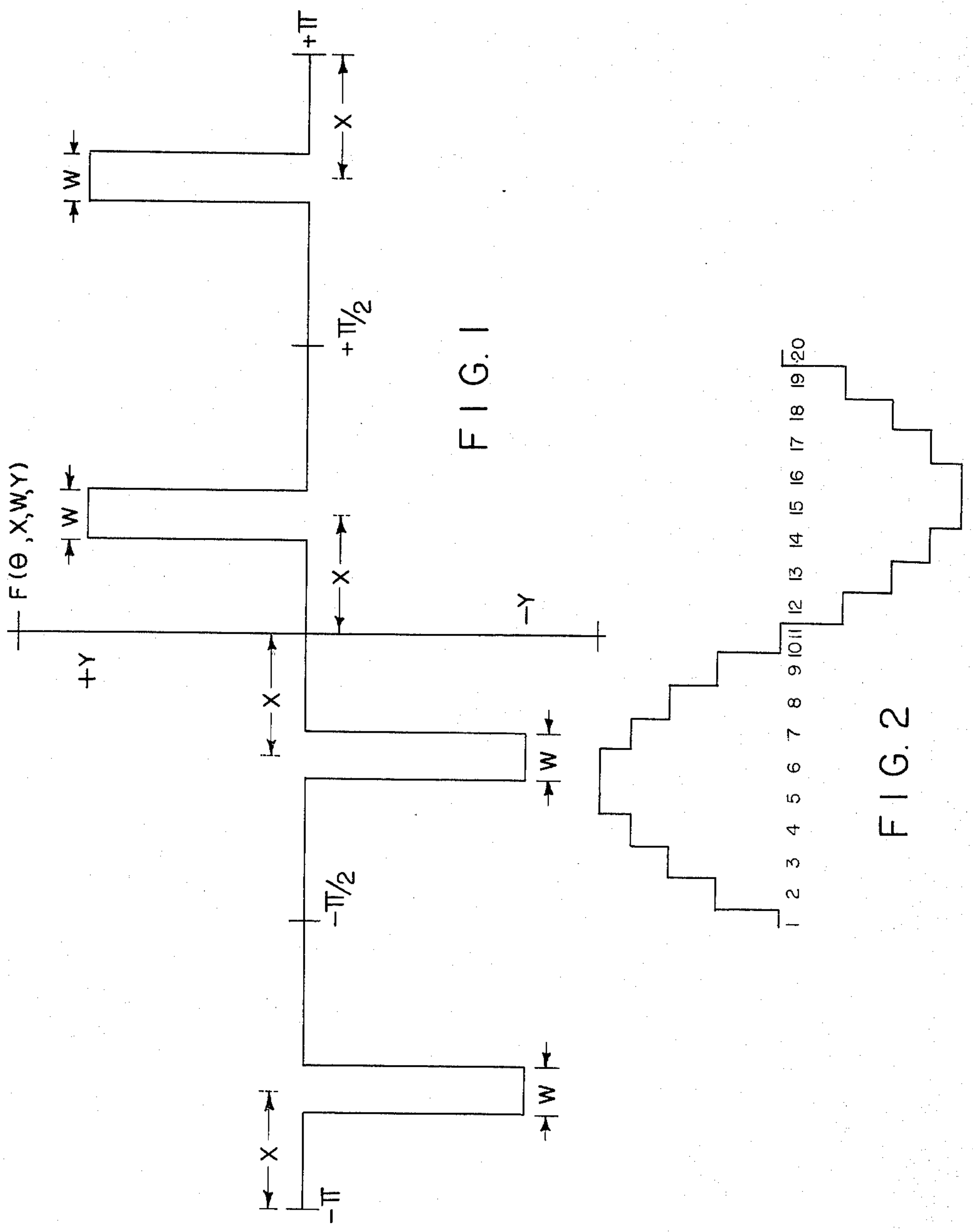
FIG. 1 depicts a generalized form of a periodic waveform.
FIG. 2 illustrates a periodic waveform produced in accordance with the invention.

Consider, for example, the periodic wave depicted in FIG. 1 where one period of the wave is shown. That generalized wave is a function of the pulse width W, the pulse amplitude Y, and the pulse displacement X. The generalized wave F (Θ, X, Y, W), referred to also as F(Θ), has the following restrictions on its variables:

$$0<\frac{W}{2}\leq X$$

$$\frac{W}{2}\leq X\leq\frac{\pi}{2}-\frac{W}{2}$$

$$Y\neq 0$$

In the first portion of the following analysis, the harmonic content of the wave is obtained in terms of the X, W, and Y parameters.

A periodic waveform of the type meeting certain unstringent rules as to discontinuities can be represented as a Fourier series.

The generalized form of the series is $$F(\theta)=A0+\sum_{i=1}^{i=\infty} Ai \sin i\theta + \sum_{i=1}^{i=\infty} Bi \cos i\theta$$

where $Ai$ are $Ai$ (X, W, Y)
$Bi$ are $Bi$ (X, W, Y)

and $$A0=\frac{1}{2\pi}\int_{-\pi}^{\pi} F(\theta)d\theta$$

$$Ai=\frac{1}{\pi}\int_{-\pi}^{\pi} F(\theta) \sin \theta d\theta$$

$$Bi=\frac{1}{\pi}\int_{-\pi}^{\pi} F(\theta) \cos i\theta d\theta$$

The proof of the above may be obtained by referring to any mathematics textbook treating Fourier series with "Advanced Mathematics for Engineers" by H. W. Reddick and F. H. Miller, John Wiley and Sons, New York, second edition, pages 181–185, being one of these.

A rapid observation of FIGURE 1 shows that $$\frac{1}{2\pi}\int_{-\pi}^{\pi} F(\theta)=0$$

as each cycle has an equal number of identical positive and negative pulses.

In regard to the waveform of FIGURE 1, it may be observed that it has "odd" symmetry, namely, $$F(\Theta)=-F(-\Theta)$$

Again referring to a standard text (page 190, Advanced Mathematics for Engineers, 2nd ed.) one may show that for $F(\Theta)=-F(-\Theta)$ $$\int_{-\pi}^{0} F(\Theta) \cos i\theta d\theta \int_{0}^{\pi} F(\Theta) \cos i\theta d\theta$$

hence all B$i$ terms are zero and the Fourier series of the wave of FIGURE 1 is a sin series only.

Again in regard to the waveform of FIGURE 1 another symmetry exists, namely, $F(\Theta)=F(\pi-\Theta)$.

Hence for $i$ even, that is, $i=2n$, $n=1, 2 \ldots$ $$A_{2n}=\frac{1}{\pi}\int_{-\pi}^{\pi} F(\Theta) \sin 2n\theta d\theta$$

breaking this integral into four (4) parts, each being integrated over a $\pi/2$ segment, and replacing $\theta$ with $(\pi-\Theta)$ in integral 1; $\Theta$ with $-(\pi-\Theta)$ in integral 2 and simultaneously changing the units to correspond with the variable change.

$$A_{2n}=\frac{1}{\pi}\int_{0}^{\pi/2} F(-\pi-\Theta) \sin -2n(\pi-\Theta)d-(\pi-\Theta)$$

$$+\int_{\pi/2}^{0} F(-\Theta) \sin -2n\theta d-(\Theta)$$

$$+\int_{0}^{\pi/2} F(\Theta) \sin 2n\theta d\theta$$

$$+\int_{\pi/2}^{0} F(\pi-\Theta) \sin 2n(\pi-\Theta)d(\pi-\Theta)$$

replacing $F(-\Theta)$ with $-F(\Theta)$ and $F(\pi-\Theta)$ with $F(\Theta)$ as required and noting that $\sin 2n\theta=-\sin-2n\theta$ also $$\sin 2n(\pi-\theta)=-\sin 2n\theta$$

$$A_{2n}==\frac{1}{\pi}\left[-\int_{0}^{\pi/2} F(\Theta) \sin 2n\theta d\theta\right.$$

$$-\int_{\pi/2}^{0} F(\Theta) \sin 2n\theta d\theta$$

$$+\int_{0}^{\pi/2} F(\Theta) \sin 2n\theta d\theta$$

$$\left.+\int_{\pi/3}^{0} F(\Theta) \sin 2n\theta d\theta\right]$$

Thus, $A_{2n}=0$. Hence the Fourier series representation of FIGURE 1 is a series of odd sin terms.

$$F(\Theta)=\sum_{i=1}^{\infty} A2i-1 \sin (2i-1)\Theta$$

To simplify further work it will be shown that $$A2i-1=\frac{4}{\pi}\int_{0}^{\pi/2} F(\Theta) \sin (2i-1)\Theta d\theta$$

As $$A2i-1=\frac{1}{\pi}\int_{-\pi}^{\pi} F(\Theta) \sin (2i-1)\Theta d\theta$$

we may break the integration in four (4) integrals each over a $\pi/2$ segment as before. Then we may replace $\Theta$ with $-(\pi-\Theta)$ in 1
$\Theta$ with $-\pi$ in 2
$\Theta$ with $\pi-\Theta$ in 3 and change limits of integration to correspond to the variable change. Hence $$A_{2i-1}=\frac{1}{\pi}\left[\int_{0}^{\pi/2} F-(\pi-\theta) \sin (2i-1)-(\pi-\theta)d-(\pi-\theta)\right.$$

$$+\int_{\pi/2}^{0} F(-\Theta) \sin -(2i-1)\Theta d(-\theta)$$

$$+\int_{0}^{\pi/2} F(\Theta) \sin (2i-1)\Theta d\theta$$

$$\left.+\int_{\pi/2}^{0} F(\pi-\Theta) \sin (2i-1)(\pi-\theta)d(\pi-\theta)\right]$$

replacing $F(-\Theta)$ with $-F(\Theta)$ and $F(\pi-\Theta)$ with $F(\Theta)$ as required and noting that $\sin (2i-1)\Theta=-\sin-(2i-1)\Theta$ and $\sin (2i-1)(\pi-\Theta)=\sin (2i-1)\Theta$ then $$A_{2i-1}=\frac{1}{\pi}\left[+\int_{0}^{\pi/2} F(\theta) \sin (2i-1)\theta d\theta\right.$$

$$-\int_{\pi/2}^{0} F(\theta) \sin (2i-1)\theta d\theta$$

$$+\int_{0}^{\pi/2} F(\theta) \sin (2i-1)\theta d\theta$$

$$\left.-\int_{\pi/2}^{0} F(\theta) \sin (2i-1)\theta d\theta\right]$$

and $$A_{2i-1}=\frac{4}{\pi}\int_{0}^{\pi/2} F(\theta) \sin (2i-1)\theta d\theta \qquad \text{QED}$$

Using the just derived expression one may solve for the Fourier coefficients. Referring to FIGURE 1

$$A_{2i-1}=\frac{4}{\pi}\int_{x-W/2}^{x+W/2} Y \sin (2i-1)\theta d\theta$$

Changing $\theta$ to $$\frac{1}{2i-1}\theta$$

and changing limits accordingly $$A_{2i-1}=\frac{4}{(2i-1)\pi}\int_{(2i-1)(x-W/2)}^{(2i-1)(x+W/2)} Y \sin \theta d\theta$$

$$=\frac{4Y}{(2i-1)\pi}(-\cos \theta)\Big|_{(2i-1)(x-W/2)}^{(2i-1)(x+W/2)}$$

$$=\frac{-4Y}{(2i-1)\pi}\left[\cos (2i-1)(x+W/2)-\cos (2i-1)\left(x-\frac{W}{2}\right)\right]$$

using the trigonometric identities $$\cos x+y=\cos x \cos y-\sin x \sin y$$

$$\cos x-y=\cos x \cos y+\sin x \sin y$$

one obtains $$A_{2i-1}=\frac{8Y}{(2i-1)\pi}\left[\sin (2i-1)x \sin (2i-1)\frac{W}{2}\right]$$

This is the $2i-1$ harmonic content of the wave of FIGURE 1. Examining this expression one may observe that for $$(2i-1)x=m\pi \qquad m=0, 1, 2 \ldots \text{ or}$$

$$(2i-1)\frac{W}{2}=r\pi \qquad r=0, 1, 2 \ldots$$

$A_{2i-1}$ is zero.

In our formulation $x \geqq W/2>0$ so we are not interested in the $m=0$ case or the $r=0$ case.

Considering the $(2i-1)x=m\pi$ zero condition one notes that there are $i-1$ values of $x$ other than $x=0$ such that $(2i-1)x$ is an integral multiple of $\pi$ and $A2i-1$ equal to zero. (This assumes a properly chosen $w$.)

Consider a new waveform $G(\theta, n)$ consisting of $n-1$ pulses each at one of the $$x=\frac{mr}{2n-1} \qquad m=1, 1 \cdots n-1$$

positions.

$$G(\theta, n)=\sum_{m=1}^{n-1} F\left(\theta, \frac{m\pi}{2n-1}, Ym, Wm\right)=\sum_{m=1}^{n-1} F_m{}^n(\theta)$$

Since the Fourier series of $G(\theta, n)$ is the sum of the Fourier series of $F^n(\theta)$.

(1) The $$A^1_{2n-1}$$

term is zero because of the chosen values of $x$ (2)

$$A^1_{2r-1}=\frac{8}{(2r-1)\pi}\sum_{m=1}^{m=n-1} Ym \sin\frac{m(2r-1)\pi}{(2n-1)} \sin\frac{Wm}{2}(2r-1)$$

where $$A^1_{2r-1}=\frac{1}{\pi}\int_{-\pi}^{\pi} G(\theta, n) \sin (2r-1)\theta d\theta$$

(3) All A even and B terms are zero.

Now let us allow all $Wm$ terms to be equal;

$$W1=W2= \ldots W2n-1=W$$

and write $n-2$ equations of the form of (2) above.

$$A_{2r_1}-1=$$
$$\frac{8}{(2r_1-1)\pi} \sin\frac{W}{2}(2r_1-1) \sum_{m=1}^{m=n-1} Ym \sin m\frac{(2r_1-1)\pi}{2n-1}$$
$$A_{2r_{n-2}}-1=$$
$$\frac{8}{(2r_{n-2}-1)\pi} \sin\frac{W}{2}(2r_{n-2}-1) \sum_{m=1}^{m=n-1} Ym \sin m\frac{(2r_{n-2}-1)\pi}{2n-1}$$

Now if we set these equations to zero, that is, $0=A_{2r_1}-1= \ldots A_{2r_{n-2}}-1$ we can always solve these $n-2$ equations to obtain $n-2$ ratios of the variables $Y1/Yn-1$, $Y2/Yn-1 \ldots Yn-2/Yn-1$.

Hence, we can set the ratios of Y terms to set an additional $n-2$ harmonic terms to zero.

Furthermore, if $$\sum_{m=1}^{m=-1} Ym \sin m\frac{(2r-1)\pi}{2n-1}=0$$

$$\text{than} \sum_{m=1}^{m=n-1} Ym \sin\left[\pm\frac{m(2r-1)\pi}{2n-1}+2m\pi\right]=0$$

$$\text{or} \sum_{m-1}^{m=n-1} Ym\left[\sin\frac{m}{2n-1}\pm(2r-1)+2(2n-1)\right]\pi=0$$

so if $A_{2r-1}=0$; $A_{2(2n-1)\pm(2r-1)}=0$; so that by setting the $Ym$'s to reduce an $A_{2r-1}$ harmonic component term to zero we have set many corresponding harmonics to zero, namely, those reflected about odd multiples of $2n-1$.

In this invention an $n$ is chosen and the $2n-1$ harmonic is reduced to zero via choosing $x$ values. The $n-2$ odd harmonics below $2n-1$ are set to zero via choosing $n-2Y$ ratios. As shown, at the same time, this reduces many other harmonics to zero including the $n-2$ odd harmonics above $2n-1$.

A harmonic analysis of the waveform will then contain a first harmonic and reflections of the first harmonic about odd multiples of $2n-1$.

In the implementation of this invention it is practical to let $W=\pi/2n-1$ and fill in the spaces between steps. However, one may use the control over W, if desired to further reduce the harmonic content.

Example:

let $n=5$ $\quad 2n-1=9$ $$\text{then } x=\frac{m\pi}{9} \qquad m=1, 2, 3 \cdots n-1$$
$$=\frac{\pi}{9}, \frac{2\pi}{9}, \frac{3\pi}{9}, \frac{4\pi}{9}$$
$$=20°, 40°, 60°, 80°,$$
$$W=\frac{\pi}{9}=20°$$
$$Y2/Y1=1.879$$
$$Y3/Y1=2.532$$
$$Y4/Y1=2.879$$

The synthesized waveform is depicted in FIGURE 2.

The lowest harmonics beyond the first will be the 17th and the 19th, and those harmonics have 1/17 and 1/19 the amplitude of the fundamental respectively.

If W is set to $2\pi/17=21.2°$ instead of 20° (requiring overlapping of steps) the 17th harmonic may also be eliminated.

In the waveform of FIG. 2, the successive pulses abut one another and hence form a stepped wave. From the foregoing analysis, however, it is apparent that the pulses need not be contiguous in the sense that one begins where the preceding pulse leaves off. Indeed, the pulses may be separated by intervals or the pulses may overlap so that two pulses are coexistent.

The waveform of FIG. 2 represents a periodic wave synthesized from contiguous pulses spaced evenly along the X axis. The amplitude of the pulses in the waveform of FIG. 2 may have any one of five different levels and the amplitude, excepting zero amplitude, is either positive or negative in accordance with the convention as to whether the pulse is above or below the reference axis. The amplitudes of the pulses are given in the table below:

| Pulse Displacement | Pulse Amplitude |
|---|---|
| 0 | 0 |
| +20 | +1.0 |
| −20 | −1.0 |
| +40 | +1.879 |
| −40 | −1.879 |
| +60 | +2.532 |
| −60 | −2.532 |
| +80 | +2.879 |
| −80 | −2.879 |
| +100 | +2.879 |
| −100 | −2.879 |
| +120 | +2.532 |
| −120 | −2.532 |
| +140 | +1.879 |
| −140 | −1.879 |
| +160 | +1.0 |
| −160 | −1.0 |
| +180 | 0 |
| −180 | 0 |

As previously stated, the waveform depicted in FIG. 2 does not have in its components the 3rd through 15th harmonics but contains a 17th and 19th harmonic which have amplitudes of 1/17 and 1/19 of the fundamental, respectively.

Figure 3:
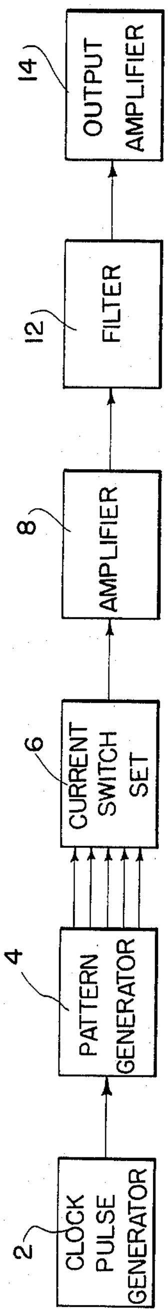
FIG. 3 depicts the schematic arrangement of the preferred embodiment of the invention.

A systematic arrangement of the invention is shown by the block diagram of FIG. 3. The basic frequency determining component of the invention is a pulse generator which acts as the clock in the invention. Generator 2 is a mechanism of a type which periodically emits an electrical pulse, the pulse being analogous to the tick of a mechanical clock. The rate at which pulses are emitted by the generator is known as the pulse repetition frequency and the generator is constructed to permit that repetition frequency to be varied over a wide range.

The pulses emitted by the clock are impressed upon a pattern generator 4 which in response to the clock pulses puts out a sequence of switching signals. Pattern generator 4 can be constructed from a plurality of bistable circuits, arranged to provide signals in a desired sequence.

The switching signals emitted by the pattern generator are impressed upon current switch set 6 to cause the switch set to provide an electrical current having a stepped waveform of the type depicted in FIG. 2. That waveform, as previously explained, has sinusoidal components which are the fundamental and only very high order harmonics. The stepped current waveform is fed to the summing junction of an operational amplifier 8. For a discussion of an operational amplifier, the reader is referred to "Pulse and Digital Circuits," 1st ed., by Millman and Taub, published by McGraw-Hill, and specifically the discussion beginning on page 22 of that book.

Operational amplifier 8 has its output applied to a filter 12 which functions to remove harmonic components. Filter 12, for example, may be a low-pass five-pole maximally flat Butterworth active filter. That filter has a frequency response characterized by the formula $$\frac{1}{\left[1+\left(\frac{f}{f_c}\right)^{10}\right]^{1/2}}$$

where $f$ is the frequency variable and $f_c$ is the filter's cut-off frequency.

Many and varied types of filters can be used in the invention. What is required of the filter is that it attenuate the harmonics and that fundamental frequencies be passed with very little attenuation or that all fundamentals be attenuated equally, regardless of frequency.

Where the fundamental is selected from a frequency range extending over an octave, a single filter of the foregoing Butterworth type can accomplish the desired filtering. Where, however, the invention is to be employed over a broader frequency range, it may be necessary or desirable to employ more than one filter and to switch the output of amplifier 8 to a particular filter when the selected fundamental is within a particular band of frequencies.

*Current switch set*

Figure 4:
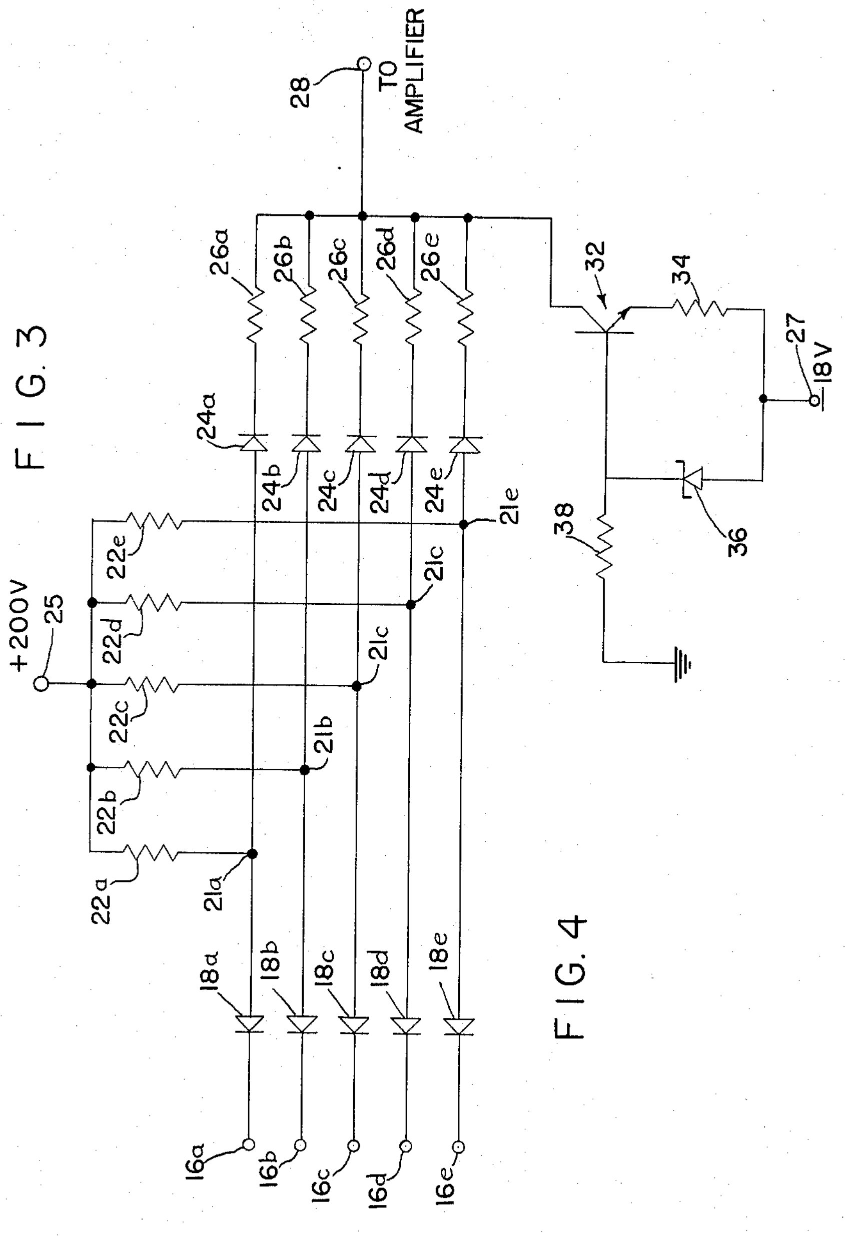
FIG. 4 depicts a preferred embodiment of a current switch set utilized in the invention.

A preferred embodiment of the current switch set is diagrammatically shown in FIG. 4. The set of switches has a plurality of input terminals **16*a* to 16*e*, signals from pattern generator 4 being applied to those input terminals in a sequence determined by the pattern generator. The output of the switch set is delivered to terminal 28 which is the summing junction of the operational amplifier. A terminal at which a constant positive potential is maintained, here assumed to be 200 volts, is indicated at 25. Resistors 22*a* to 22*e* are connected in parallel to terminal 25. One end of resistor 22*a* is connected by a diode 18*a* to terminal 16*a* and by a diode 24*a* in series with a resistor 26*a* to terminal 28. One end of resistor 22*b* is connected by a diode 18*b* to terminal 16*b* and by a diode 24*b* in series with a trimmer resistor 26*b* to terminal 28. Similarly, the other resistors 22*c* to 22*e* are connected to corresponding input terminals by diodes 18*c* to 18*e* and are connected to terminal 28 by diodes 24*c* to 24*e* and trimmer resistors 26*c* to 26*e*. The diodes 18*a* to 18*e* and 24*a* to 24*e* are arranged so that the currents flowing from terminal 25 through resistors 22*a* to 22*e* must either pass to terminals 16*a* to 16*e* or flow into summing junction 28. Because junction 28** is the summing junction of an operational amplifier, the junction is a virtual ground.

An NPN transistor 32 has its collector connected to summing junction 28 and has its emitter connected by a resistor 34 to a terminal 27 which is maintained at a negative potential, here indicated to be −18 volts. The base of transistor 32 is grounded through a resistor 38. Zener diode 36, has its anode connected to negative potential terminal 27 and its cathode connected to the base of the transistor.

For expository purposes, it is assumed that each of the signals put out by pattern generator 4 is at one of two D.C. levels, the levels being +3 volts and −3 volts. It is to be understood that the pattern generator puts out five parallel signals which are supplied to input terminals **16*a* to 16*e*** respectively. The pattern generator is arranged to cause those five signals to shift their D.C. levels in the sequence set out in the truth table of FIG. 5. In accordance with conventional binary notation, the binary 1 represents the +3 volt levels and the binary 0 represents the −3 volt level. In the truth table, the increments 1 through 20 correspond to the identically numbered time increments in FIG. 2, a time increment in the waveform of FIG. 2 being the width of each pulse, excepting increments 1, 10, 11, and 20, which are half the normal pulse width.

The initial pulse emitted by the clock 2 causes pattern generator 4 to impress a +3 signal on input terminal **16*a* of the switch set and simultaneously −3 volt signals are impressed on input terminals 16*b* to 16*e*. Because of the 200-volt potential at terminal 25, diodes 18*a* to 18*e* are forwardly biased. In the forwardly biased state, the resistive impedance of those diodes is very small and therefore the +3 volt signal appears at junction 21*a* and −3 volt signals appear at junctions 21*b* to 21*e*. Summing junction 28 is a virtual ground and therefore the −3 volt levels at junctions 21*b* through 21*e* cause diodes 24*b* through 24*e* to be reversely biased. The +3 volt level at junction 21*a* causes diode 24*a*, however, to be forwardly biased. Upon diode 24*a* becoming forwardly biased, current flowing from terminal 25 through resistor 22*a* is diverted through diode 24*a* and flows through trimmer resistor 26*a* to junction 28. Trimmer resistor 26*a* is adjusted to cause the voltage drop across it and diode 24*a* to be approximately one volt. The current flowing through diode 24*a* and its trimmer resistor causes the potential at junction 21*a* to fall from +3 volts to 1 volt. That fall in potential causes diode 18*a* to become reversely biased because a +3 volt signal is maintained at terminal 16*a* during the first time increment. With diode 18*a* cut-off, all the current flowing through resistor 22*a* flows into summing junction 28. The currents flowing through resistors 22*b* to 22*e* flow to terminals 16*b* to 16*e***, respectively.

Transistor 32 and its associated components are arranged to cause a constant current to flow through that transistor which is exactly equal to the current flowing through resistor **22*a* to summing junction 28. The current flowing through resistor 22*a* to the summing junction, therefore, exactly equals the constant current flowing away from that junction through transistor 32**. In this circumstance the summing junction is balanced at virtual ground and the output of the operational amplifier is zero. The amplifier's zero output is indicated in FIG. 2 by the zero level of the waveform during the first time increment.

The beginning of the second time increment is caused by the next pulse from clock 2 which is applied to the pattern generator. In response to that clock pulse, the pattern generator, as shown by the truth table, causes the signal at input terminal **16*b* to change from 0 to 1 (that is, to change from the −3 volt level to the +3 volt level), while all the other signals remain unaltered. As a consequence of that change, diode 24*b* becomes forwardly biased and diode 18*b* becomes reversely biased. The current flowing through resistor 22*b*, hence, is switched from flowing to terminal 16*b* and instead flows entirely into summing junction 28. The current flowing through diode 24*b*** into the summing junction causes the output of the operational amplifier to rise from zero to the amplitude indicated during the second time increment in the waveform of FIG. 2.

Each successive pulse from the clock 2 causes the pattern generator to alter its output as indicated in the truth table. The events, thereby, set into motion cause the stepped waveform of FIG. 2 to appear at the output of the operational amplifier.

The value of resistor **22*a* is chosen so that the current flowing through it equals the sum of the currents flowing through resistors 22*b* to 22*e*. As previously stated, the current flowing through transistor 32 is equal to the current flowing through resistor 22*a* and, therefore, the current through the transistor is also equal to the sum of the currents flowing through resistors 22*b* to 22*e*. Sometime after the end of the ninth increment and before the beginning of the twelfth increment, the current flowing through resistor 22*a* to terminal 28 must be replaced, at terminal 28, by the currents from resistors 22*b* to 22*e*. That requires diode 24*a* to be biased to cut-off while diodes 24*b* to 24*e* are, simultaneously, biased to conduction. The transients caused by the switching of those diodes are, in effect, noise having Fourier components. The transients have the least effect upon the output of the filter 27** when those transients are centered between the end of the ninth interval and the beginning of the twelfth interval.

To obtain the desired centering of the noise transients, intervals 10, 11, 20, and 1 are made one-half the width of increments 2 to 9 and 12 to 19. This is accomplished, quite simply, by having the pattern generator respond to every second clock pulse during intervals 2 to 9 and 12 to 19 and having that generator respond to every clock pulse during intervals 10, 11, 20, and 1.

While a preferred embodiment of the invention has been described, it is evident to those knowledgable in the electrical and electronics arts that other mechanizations of the invention are feasible. For example, rather than having the pattern generator control sources of current, as it does in the described embodiment, the pattern generator could be constructed to control sources of voltage. With this arrangement, the operational amplifier 8 would be replaced by a voltage amplifier, if amplification were necessary.

With appreciation of the modifications that can be made in structural components without departing from the underlying concept of the invention, it is intended that the scope of the invention not be restricted to the precise details of the embodiment described above, but rather that the invention be accorded the scope delimited by the appended claims.

What is claimed is:

1. A sine wave generator comprising:

a source of periodic clock pulses;

a generator emitting a plurality of contemporaneous output signals, the output signals changing in a repetitive pattern in response to the application of the clock pulses at the generator's input;

a plurality of constant current sources, the magnitude of current from one of the sources being equal to the magnitude of the combined currents from all the other aforesaid constant current sources;

a plurality of switches equal to the plurality of constant current sources, each switch controlling the flow of current from a different one of the constant current sources to a common summing junction;

bias means connected to the common summing junction for providing a current equal to one half the magnitude of the combined currents from all the constant current sources, the flow of the currents from the constant current sources being in the direction causing those currents to be additive at the summing junction whereas the current provided by the bias means flows in the direction causing that current to be subtractive at the summing junction; and the plurality of switches being opened or closed in correspondence with the pattern of contemporaneous signals from the generator whereby a stepped waveform appears at the summing junction, the magnitudes of the constant currents being weighted so that the waveform is constituted by a fundamental component and odd harmonics of higher order than the 13th.

2. Apparatus for synthesizing a sine wave, the apparatus comprising:

a plurality of sources providing constant currents of different magnitudes, the magnitude of current from one of the sources being equal to the combined currents from all the other aforesaid sources;

a current summation terminal;

means for causing the sources to be connected to and disconnected from the summation terminal in a repetitive pattern;

bias means connected to the summation terminal for providing a current equal to one half the magnitude of the combined currents from all the constant current sources, the flow of the currents provided by the aforesaid plurality of sources being in the direction causing those currents to be additive at the summing junction and the flow of current provided by the bias means being in the direction causing that current to be subtractive at the summing junction, the bias means thereby establishing the zero axis of the synthesized sine wave; and the magnitudes of the constant currents being weighted whereby a stepped waveform appears at the summation terminal having a fundamental component and only odd harmonics higher than the 13th; and means connected to the summation terminal for separating the harmonics from the fundamental component.

References Cited by the Examiner

UNITED STATES PATENTS

| | | | |
|---|---|---|---|
| 2,532,338 | 12/50 | Schlesinger | 329—109 |
| 2,719,225 | 9/55 | Morris | 329—109 |
| 2,736,007 | 2/56 | Kenyon | 328—156 |
| 2,878,999 | 3/59 | Lindsey et al. | |
| 3,002,142 | 9/61 | Jensen | 328—156 |
| 3,100,851 | 8/63 | Ross et al. | 328—186 |

ROY LAKE, *Primary Examiner.*

JOHN KOMINSKI, *Examiner.*